United States Patent [19]

Nair et al.

[11] Patent Number: 4,952,385
[45] Date of Patent: Aug. 28, 1990

[54] FERRISILICATE MOLECULAR SIEVE AND USE AS A CATALYST

[75] Inventors: Vinayan Nair, Atlanta; Rosemarie Szostak, Covington, both of Ga.

[73] Assignees: Georgia Tech Research Corp.; Georgia Institute of Tech., both of Atlanta, Ga.

[21] Appl. No.: 20,369

[22] Filed: Mar. 2, 1987

[51] Int. Cl.$^5$ .............................................. C01B 33/20
[52] U.S. Cl. ..................................... 423/326; 423/594
[58] Field of Search ............... 423/326, 328, 329, 330, 423/594; 502/77, 85, 162, 66

[56] References Cited

U.S. PATENT DOCUMENTS

| | | | |
|---|---|---|---|
| 3,702,888 | 11/1972 | Argauer et al. | 423/328 |
| 3,941,871 | 3/1976 | Dwyer et al. | 423/328 |
| 4,208,305 | 6/1980 | Kouwenhoven et al. | 423/326 |
| 4,324,696 | 4/1982 | Miale | 423/328 |
| 4,337,176 | 6/1982 | Boersma et al. | 423/326 |
| 4,371,628 | 2/1983 | Nanne et al. | 423/328 |
| 4,456,582 | 6/1984 | Marosi et al. | 423/326 |
| 4,462,971 | 7/1984 | Hinnenkamp et al. | 423/326 |
| 4,507,404 | 3/1985 | Minderhoud et al. | 423/326 |
| 4,554,396 | 11/1985 | Chang et al. | 423/326 |
| 4,564,511 | 1/1986 | Desmond et al. | 423/326 |
| 4,708,857 | 11/1987 | Leen et al. | 423/326 |

FOREIGN PATENT DOCUMENTS 2831611   2/1980   Fed. Rep. of Germany ...... 423/326

OTHER PUBLICATIONS

Ratnasamy et al., "Structure and Catalytic Properties of Ferrisilicate Zeolites of the Pentasil Group", Proc. Int. Symp. on Zeolite Catalysis, Hungary, May 13–16, 1985.
Tielen et al., "Isomorphic Substitution in Zeolites: It's Potential Catalytic Applications", Proc. Int. Symp. on Zeolite Catalysis, Hungary, May 13–16, 1985.
Chu et al., "Isomorphous Substitution in Zeolite Frameworks", J. Phys. Chem. 89, (1985), pp. 1569–1571.
Szostak et al., "Preparation of Ferrisilicate ZSM-5 Molecular Sieves", J. Catal. 100, (1986), pp. 555–557.

*Primary Examiner*—John Doll
*Assistant Examiner*—R. Bruce Breneman
*Attorney, Agent, or Firm*—Oldham & Oldham Co.

[57] ABSTRACT

Ferrisilicate molecular sieves of the ZSM-5 type, having $SiO_2/Fe_2O_3$ mole ratios ranging from 20 to 400, are prepared by adding a silica source and a quaternary ammonium salt in that order to an acedified solution of an iron (III) compound, crystallizing the resulting gel to form a ferrisilicate molecular sieve, and thermally treating the molecular sieve with nitrogen, air and/or steam at 300° to 700° C. Preferred thermal treatment comprises treating with nitrogen first, then with air or steam. Thermally treated molecular sieves contain iron both in and outside the crystal framework; most of the non-framework iron is dispersed as very finely divided iron oxides on internal surfaces. Molecular sieves are useful as catalysts in Fischer-Tropsch and other iron oxide-catalyzied reactions.

6 Claims, No Drawings

FERRISILICATE MOLECULAR SIEVE AND USE AS A CATALYST

TECHNICAL FIELD

This invention relates to processes for making crystalline ferrisilicate molecular sieves. More particularly, this invention relates to processes for making crystalline ferrisilicate molecular sieves of the ZSM-5 type.

BACKGROUND ART

Molecular sieves are ordered, porous crystalline materials having a definite three-dimensional crystal structure, within which there are a large number of small cavities which are interconnected by a number of still smaller channels or pores. These cavities and pores in any specific molecular sieve material are of precisely uniform size. Since the pores are of such size as to accept for adsorption molecules which are small enough to pass through the pores, while rejecting molecules of larger size, the materials have come to be known as "molecular sieves" and are utilized in various ways which take advantage of this property. Molecular sieves may be used, for example, as catalysts, selective adsorbents, drying agents, ion exchange materials, and for other purposes. Aluminosilicate molecular sieves are frequently referred to as zeolites.

The synthetic crystalline aluminosilicate zeolites are the best known molecular sieves. These materials are characterized by a rigid three-dimensional network of $SiO_4^-$ and $AlO_4^-$ tetrahedra, which are cross-linked through shared oxygen atoms. The electronegativity of the aluminum-containing tetrahedra is balanced by the inclusion in the crystal of a cation, typically monovalent or divalent, such as an alkali metal (e.g. sodium) or an alkaline earth metal (e.g. calcium). The monovalent or divalent ion is typically at least partially exchangeable by conventional ion exchange techniques. The aluminum and silicon are not exchangeable. Various aluminosilicate molecular sieves are known. One of these is ZSM-5, which is described, for example, in U.S. Pat. No. 3,702,886 to Argauer et al.

Less well known are the ferrisilicate molecular sieves. One of these, ZSM-12, is described in published European Patent Application (EPA) No. 0013630. Another is the crystalline silicate described in U.S. Pat. No. 4,208,305 to Kouwenhoven et al. This latter material is of the ZSM-5 type and, according to the patent, consists structurally of a three-dimensional network of $SiO_4$, $FeO_4$, and optionally $AlO_4$, $GaO_4$ and $GeO_4$ tetrahedra which are interlinked by oxygen atoms. The patent discloses a number of catalytic processes in which the molecular sieves may be used. However, direct conversion of a carbon monoxide-hydrogen mixture to a hydrocarbon mixture (the Fischer-Tropsch synthesis) is not among these reactions.

Iron-containing zeolites are also known. These may be prepared by (a) physical admixture of a zeolite and an iron component, (b) ion exchange of Fe (III) into a zeolite, (c) adsorption of a volatile metal compound in the zeolite cavities followed by thermal decomposition, and (d) impregnation of a zeolite with a solution of a ferric compound followed by thermal decomposition.

In catalysts where the iron component is physically mixed with the zeolite ZSM-5, an intimate mixture between the two components is very difficult to obtain. Thus, all of the iron component is likely to be on the outside of the pores of the molecular sieve making these catalysts least selective for the Fischer-Tropsch reaction. Further, the formation of large metal oxide particles decreases the amount of surface available for reactions to take place.

Loss of crystallinity and thermal stability is reported for synthetic zeolites which are ion exchanged with ferric ions. The ion exchange of Fe (III) cations into the zeolite can give rise to a high dispersion of the iron component. However, ion exchanging of Fe (III) ions into the zeolite ZSM-5 has not been completely successful, due to the size of the hydrated iron complex and the high dispersion of monovalent exchange sites within the zeolites.

Iron (O) (i.e., metallic iron) species can be introduced into the pores of a zeolite by adsorption and subsequent decomposition of the iron complexes. The most common volatile metal compound that is used to prepare iron containing zeolites is iron pentacarbonyl, $Fe(CO)_5$. The size of the iron pentacarbonyl is just about ideal to be adsorbed by zeolite Y. The iron pentacarbonyl is first adsorbed by the zeolite and then the carbon monoxide is driven off from the iron pentacarbonyl by thermolysis. This process of making iron containing zeolites has the disadvantage that during the process of thermolysis, The adsorbed metal compound tends to come out of the pores of the zeolite. Moreover, the iron pentacarbonyl is too large in size to enter the zeolite ZSM-5 and hence when used over zeolite ZSM-5 will have all of the iron present outside the pores of the zeolite ZSM-5.

DISCLOSURE OF THE INVENTION

This invention according to a first aspect provides novel crystalline ferrisilicate molecular sieves of the ZSM-5 type. These molecular sieves have an overall silica to ferric oxide ($SiO_2/Fe_2O_3$) mole ratio in the range of about 20 to 400. A first portion of the iron content is in the crystal framework or lattice, and the remaining portion of the iron is outside the crystal framework. This remaining portions constitutes from about 0 to about 80 percent by weight of the total iron content and is dispersed in the form of finely divided particles on the internal and external surfaces of the molecular sieve. At least about 30 percent, preferably at least about 50 percent, most preferably at least about 80 percent, of the non-framework iron is dispersed on the internal surfaces. Nearly all of the non-framework iron on the internal surfaces is in the form of iron oxide particles having a particle size less than about 5 Angstrom units, while iron on the external surfaces is in the form of iron oxide particles predominantly from about 5 to about 15 Angstrom units.

This invention according to a second aspect provides a process for preparing ferrisilicate molecular sieves of the ZSM-5 type. This process comprises: (a) adding a silica source and one or more compounds selected from the group consisting of primary, secondary and tertiary amines and quaternary ammonium compounds to an acidic aqueous solution of an iron compound, and maintaining said solution in the acidic state until the addition of said silica source is complete; (b) heating the mixture obtained in step (a) at a temperature of about 100° to about 250° C. until molecular sieve crystals are obtained; and (c) thermally treating the molecular sieve crystals formed in step (b) at a temperature from about 300° to about 1000° C. The preferred thermal treatment comprises treating the molecular sieve of step (b) in an inert atmosphere at about 450° to about 800° C. for about 6 to about 16 hours, then in air at about 400° to about 1000° C. for about 3 to about 8 hours, and then optionally with steam at about 250° to about 700° C. for about 0.5 to about 36 hours.

This invention according to a third aspect provides a process for carrying out chemical reactions using a ferrisilicate molecular sieve of the ZSM-5 type as described above. According to this process, a gaseous reactant or mixture thereof is contacted with the ferrisilicate molecular sieve under reaction conditions. In particular, this process may be a catalytic process in which a mixture of carbon monoxide and hydrogen is contacted with the molecular sieve at a temperature from about 250° to about 400° C. and at a pressure from about one to about 20 atmospheres, whereby a reaction produce comprising a hydrocarbon or mixture thereof is obtained. This hydrocarbon or mixture thereof comprises a major portion of gasoline range ($C_6$ to $C_{10}$) hydrocarbons when the temperature is maintained from about 250° to about 350° C. and the pressure is from about 10 to about 20 atmospheres.

BEST MODE FOR CARRYING OUT THE INVENTION

The ferrisilicate molecular sieves of the present invention have an overall $SiO_2/Fe_2O_3$ mole ratio in the range of about 20 to about 400, preferably from about 30 to about 200, and exhibit ZSM-5 structure. These molecular sieves consist structurally of a three-dimensional framework of $SiO_4^-$ and $FeO_2^-$ tetrahedra which are interlinked by common oxygen atoms.

Only a portion of the iron content of final product (i.e., thermally treated) molecular sieves of this invention is in the framework. Framework iron is in the form of tetrahedra. Framework iron may constitute as little as 20 percent (by weight) of total iron; typically however, framework iron is from about 50 to 100 percent of the total iron content. The remainder of the iron is outside of the framework in the form of octahedra, and consists essentially of finely divided particles of iron oxides dispersed on the internal and external surfaces of the molecular sieve. Nearly all of the particles on the internal surfaces are smaller than about 5 Angstroms (A) in size. Particles on the external surfaces are predominantly from 5 to 15 Å. Most of the non-framework iron is dispersed on the internal surfaces, i.e. surfaces of the pores and the cavities (which for convenience will simply be referred to as the pore surfaces) of the sieve. The thermally treated molecular sieves may range from off white to brown in color. Distribution of the iron content of the molecular sieve between the framework and non-framework sites may be shown by Mossbauer spectra. Thermally treated molecular sieves of this invention have a high degree of thermal stability.

The electronegativity of framework iron is balanced by exchangeable cations, e.g. hydrogen, ammonium, alkali metal or alkaline earth metal, in the crystal structure. The ion exchange capacity of a product molecular sieve furnishes a quantitative measure of the amount of framework (tetrahedral) iron present. Thermally treated molecular sieves as produced are in the hydrogen form; other exchangeable cations may be introduced by conventional ion exchange techniques. The overall $SiO_2/Fe_2O_3$ mole ratio of a thermally treated molecular sieve herein is based on the total quantity (framework plus non-framework) iron present.

The ferrisilicate molecular sieves of this invention exhibit ZSM-5 structure and may be regarded as analogs of the known crystalline aluminosilicate zeolite molecular sieves. Such molecular sieves are described, for example, in U.S. Pat. No. 3,702,886 cited above. One indication of ZSM-5 structure is the presence of pores of a uniform diameter of about 5.5 Angstroms. Another indication is an x-ray diffraction pattern which is similar to that of known ZSM-5 molecular sieves. The x-ray diffraction pattern of the molecular sieves of this invention is shown in Table I below.

TABLE I

| Number | 2, Theta | Intensity | I/Io |
|---|---|---|---|
| 1 | 7.78 | 689 | 28 |
| 2 | 8.72 | 520 | 21 |
| 3 | 11.68 | 153 | 6 |
| 4 | 13.66 | 156 | 6 |
| 5 | 13.84 | 226 | 9 |
| 6 | 15.78 | 192 | 7 |
| 7 | 17.6 | 116 | 4 |
| 8 | 19.14 | 162 | 6 |
| 9 | 20.22 | 252 | 9 |
| 10 | 22.06 | 173 | 7 |
| 11 | 22.96 | 2144 | 88 |
| 12 | 23.14 | 2431 | 100 |
| 13 | 23.58 | 676 | 27 |
| 14 | 23.82 | 1105 | 45 |
| 15 | 24.28 | 780 | 32 |
| 16 | 25.64 | 130 | 5 |
| 17 | 26.5 | 180 | 7 |
| 18 | 26.84 | 240 | 9 |
| 19 | 29.14 | 212 | 8 |
| 20 | 29.78 | 236 | 9 |

As synthesized ferrisilicate molecular sieves of this invention are crystals having a white to pale lemon yellow color, indicating that all or most (e.g., at least 90 percent) of the iron content is in the framework, and having the same mole ratio of silica to ferric oxide (i.e. from about 20 to about 400) that characterizes the final product. The percentage of iron in the framework is lower at $SiO_2/Fe_2O_3$ mole ratios below about 50. The as synthesized ferrisilicate molecular sieves may be represented on the water free basis by the following formula:

$$aR_2O \cdot Fe_2O_3 \cdot bSiO_2$$

where R is alkylammonium, dialkylammonium, trialkylammonium or tetraalkylammonium; a is from about 1 to about 6; and b is from about 20 to about 400. R is preferably tetraalkylammonium, and the alkyl groups are lower alkyl groups, i.e., alkyl groups containing from one to about 8 carbon atoms. A minor amount of R may be accounted for by an alkali metal ion, e.g. sodium.

The x-ray diffraction pattern of the as synthesized molecular sieve is substantially the same as that of the final product molecular sieve, i.e., as shown in Table I.

Preparation of the product ferrisilicate molecular sieves of this invention requires two operations, i.e. (1) preparation of the as synthesized ferrisilicate, and (2) thermal treatment of the as synthesized ferrisilicate i order to form the product ferrisilicate molecular sieve.

The as synthesized ferrisilicate is preferably formed by adding a silica source to an acidic solution of an iron (III) (i.e., ferric compound, adding to the resulting gel a primary amine, a secondary amine, and tertiary amine, or a quaternary ammonium salt and heating the resulting mixture (which is a gel), preferably in an autoclave under autogenous conditions at about 100° to about 250° C., until crystallization takes place.

The acidified solution of a ferric [i.e., ions (III)] compound is obtained by dissolving an iron (III) compound, such as ferric nitrate, ferric chloride or ferric sulfate, in water and acidifying the resulting solution with a strong mineral acid such as hydrochloric or sulfuric acid to pH not higher than about 5.

The silica source (or precursor) may be either an aqueous solution of an alkaline metal silicate or an aqueous silica sol. Alkali metal silicate solutions are ordinarily preferred, because these result in better incorporation of the iron into the framework, while use of a silica sol results in a substantial amount of non-framework (octahedral) iron in the as synthesized ferrisilicate. Representative alkaline metal silicates are N-Brand silicate (PQ Corporation), which has the formula $Na_2SiO_3 \cdot 5 H_2O$. Sodium metasilicate from other vendors can also be used. Other sodium silicates having different $SiO_2/Na_2O$ mole ratios may also be used. Representative silica sols (less suitable as previously indicated) include "LUDOX" (E. I. Dupont Company) and "Cab-O-Sil" (Cabot Corp.), both of which contain particles of high molecular weight polymeric silica beads.

It is important to add the silica source to the iron (III) solution, rather than to add the iron solution to the silica source or to charge both simultaneously to a reaction vessel, because it is important to maintain an acidic pH, preferably below about 5 throughout the addition of the silica source. If this is not done, iron (III) hydroxide will precipitate and the desired incorporation of substantially all of the iron into the framework of the as synthesized ferrisilicate gel, and the desired distribution and particle size characteristics of the iron in the final product molecular sieve, will not be obtained.

The amine or quaternary ammonium salt is preferably added after the addition of the silica source is complete. The amines are primary, secondary or tertiary alkyl amines in which the alkyl group contains from 1 to about 8 carbon atoms. Tertiary amines are preferable to the primary or secondary amines. A representative tertiary amine is tripropylamine. Preferred, however, are the quaternary ammonium salts, which are tetraalkyl ammonium salts of strong acids, the alkyl group containing from about 1 to about 8 carbon atoms. A representative quaternary ammonium salt is tetrapropylammonium (TPA) bromide.

A minor amount of alkali metal (e.g., sodium) salt may be used in addition to the amine or quaternary ammonium salt, but the latter must constitute the major source of exchangeable ions in the molecular sieve as synthesized.

The amine or quaternary ammonium salt and the silica source may be added simultaneously to the acidified iron (III) solution is desired, provided that the pH of the solution is maintained in the acidic state and preferably at a pH not over about 5 until addition of most of the silica source is complete. (When simultaneous addition is used, addition of the silica source may be completed before addition of the amine or quaternary ammonium salt is completed). However, it is ordinarily preferred to add the amine or quaternary ammonium salt after all of the silica source has been added.

The mole ratios of quaternary ammonium compound, iron compound and silica source expressed as $R_2O$, $Fe_2O_3$ and $SiO_2$ respectively, in the reactants are substantially the same as the ratio in the as synthesized ferrisilicate gel.

Ferrisilicate gel is placed in an autoclave and heated under autogenous pressure at about 100° to about 250° C. (preferably about 170° C.) for 2 to 5 days. The resulting white solid may be separated from the mother liquor, e.g., by filtration or centrifugation, then washed with water and dried at about 100° C. The resulting material is an as synthesized highly crystalline ferrisilicate molecular sieve. X-ray powder diffraction confirms the formation of the ZSM-5 structure.

The as synthesized molecular sieve is thermally treated. This generally causes a portion of the iron to migrate from the framework to the internal surfaces (and to a slight degree to the external surfaces as well). Thermal treatment comprises treatment with nitrogen, air and/or steam at a temperature from about 250° C. to about 1000° C. Preferred thermal treatment according to this invention includes treatment in an inert atmosphere, preferably a flowing stream of nitrogen, at a temperature from about 450° to about 800° C. for about 6 to about 16 hours, followed by calcining in air at a temperature from about 400° to about 1000° C. for about 3 to about 8 hours. The extent for iron migration depends on the treating agent or agents used (steam causing the greatest migration), and the temperature and time of treatment. Thermal treatment causes decomposition of the organic material (amine or quaternary ammonium salt). At least a portion of the thermal treatment should be with air in order to assure complete decomposition.

After calcination with nitrogen and air, or with air alone, the ferrisilicate molecular sieve is ammonium ion exchanged, in order to remove any sodium ion present. This may be done with an aqueous solution of an ammonium salt of strong mineral acid, such as ammonium nitrate.

After ammonium ion exchange, the molecular sieve is again thermally treated, either by calcination in air or by hydrothermal treatment with steam. According to one mode of treatment, the molecular sieve may be air dried at about 100°-120° C., then heated at a somewhat higher temperature, (e.g. about 250° to about 350° C.) for about 2 to 6 hours, and then calcined at high temperature, (e.g. about 550° to about 650° C.) for a longer time, (e.g. 6 to 24 hours). Finally, the calcined material may be ion exchanged, for example with potassium ion (as dilute KOH to a pH of 8.0), washed with water, filtered and air dried at about 100°-120° C. The produce molecular sieve formed in this manner typically contains about 50-100 percent of the iron in the framework, the remainder (about 0 to 50 percent) being finely dispersed throughout the molecular sieve, including the pore surfaces. Only a small amount of the non-framework iron is on the outside surfaces, which is desirable because iron on the outside surfaces is less reactive for catalytic reaction purposes. The non-framework iron is in the form of particles of iron oxides; nearly all the particles on internal surfaces are smaller than 0.5 Å while those on external surfaces are predominantly from 5 Å to 15 Å.

The ammonium exchanged molecular sieve described above may be hydrothermally treated with steam at about 300° to about 700° C. for about 1 to 4 hours, washed with water, filtered and air dried at about 100° to 120° C. Hydrothermal treatment with steam causes a much larger portion of the framework iron to migrate outside the framework and to become dispersed as finely divided iron oxide particles on the pore surfaces. Hydrothermal treatment with steam also causes a greater percentage of the non-framework iron to migrate to the external surfaces than is the case when a molecular sieve is thermally treated with nitrogen and air only, or with air alone. For example, a molecular sieve treated with steam at 550° to 650° C. for 1 to 4 hours may contain about 15 to 40 percent of the iron in the framework, and conversely about 60 to about 85 percent of the iron outside the framework, principally in the form of finely divided iron oxide particles not larger than about 5 Angstroms dispersed mainly on the internal surfaces. Typically about 95-97 percent of total non-framework iron in thermally treated molecular sieves (less in those having $SiO_2/Fe_2O_3$ mole ratio less than 50) is on the internal surfaces.

The ion exchange capacity of final product molecular sieves may be determined by ion exchange with dilute KOH to pH 8.0 prior to final washing and drying if desired.

The unit cell diameter of molecular sieves of this invention ranges from about 5330 Å (at a $SiO_2/Fe_2O_3$ mole ratio of 100) to about 5410 Å (at a $SiO_2/Fe_2O_3$ mole ratio of 20). Little further change in the unit cell diameter takes place as the $SiO_2/Fe_2O_3$ ratio is increased above 100.

When molecular sieves according to this invention are used for catalytic purposes, the materials should generally be available in the form of particles with a diameter of about 0.5 to about 5 millimeters. Typically the final product molecular sieve have a particle diameter in the range of about 0.5 to about 8 microns. To achieve larger size, and in increase thermal stability, the molecular sieve may be composited with an inorganic matrix or binder material if desired. Examples of suitable matrix or binder materials are naturally occurring clays, such as kaolin and bentonite. Other suitable matrix or binder materials are synthetic inorganic oxide, such as alumina, silica, zirconia or combinations thereof, as for example silica-alumina and silica-zirconia. The ratio of molecular sieve to matrix material may be as desired, and typically molecular sieve constitutes from about 10 to about 100 percent by weight of a composite.

Molecular sieves according to this invention may be used as catalysts in various reactions, but are particularly suitable as Fischer-Tropsch catalysts for the direct conversion of mixtures of carbon monoxide and hydrogen to hydrocarbons, without forming and recovering methanol as an intermediate. The carbon monoxide-hydrogen mixture may be derived by conventional means, as for example steaming of coal. The mole ratio of CO to $H_2$ in the reactant mixture may range from about 1:1 to about 3:1. Such a reactant mixture is contacted with a molecular sieve of this invention under reaction conditions, e.g. a pressure ranging from about atmospheric to about 20 atmospheres, a temperature ranging from about 250° to about 400° C., and at a weight hourly space velocity from about 0.1 to about 100 reciprocal hours ($h^{-1}$). The reaction product is a hydrocarbon mixture. The reaction mixture formed includes both the reaction product and unreacted carbon monoxide and hydrogen. The term "reaction produce", in this specification is used to denote only those materials produced in the chemical reaction, while "reaction mixture" denotes the mixture of reaction product and unreacted starting materials obtained).

Ferrisilicate molecular sieves of this invention may also be used for other catalytic reactions, particularly iron oxide-catalyzed catalytic reactions. In particular, the molecular sieves of this invention may be used as dehydrogenation and oxidation catalysts, e.g. in the oxidation of butene to butadiene, oxidation of olefins to alkene acetate esters, dehydrogenation of ethylbenzene to styrene, and oxydehydrogenation of isobutyric acid to methyacrylic acid or a lower alkyl ester thereof. Other reactions include decomposition of 2-butanol. Catalysts of this invention can also be used by hydrogenation catalysts for liquification of coal.

A major advantage of the molecular sieves of this invention is their ability to catalyze direct formation of hydrocarbons, particularly gasoline hydrocarbons from carbon monoxide-hydrogen mixtures without the necessity of producing and recovering methanol as an intermediate. Furthermore, the catalysts of this invention have good selectivity for this reaction, which is believed due to the dispersion of iron oxides on the internal surfaces (i.e. the pores) of the molecular sieve with only a comparatively small amount of iron oxides on the external surface. (Iron oxides dispersed on external surfaces tend to catalyze reactions non-selectively, while iron oxides dispersed on internal surfaces promote selective reactions). Molecular sieves of this invention are also selective catalysts for other iron oxide-catalyzed reactions.

Molecular sieves of this invention are also useful as isomerization and cracking catalysts. For example, they may be used for isomerization of straight chain alkanes to branch chain alkanes, e.g. n-hexane to isohexane. They are also useful as cracking catalysts for cracking heavy hydrocarbon fractions to produce gasoline range hydrocarbons. The preferred molecular sieves for isomerization and cracking are those in which a major portion, e.g. from about 50 to about 100 percent of total iron, remains in the framework after thermal treatment.

This invention will be further described with reference to the examples which follow. The $SiO_2/Fe_2O_3$ ratio given in each example refers to overall mole ratio.

Samples of both as synthesized and thermally treated molecular sieves were analyzed according to the procedures indicated below.

The x-ray powder defraction data were obtained using a Phillips X-Ray Difractometer (Ni filtered Cu K-alpha, 2-theta range 5°-40°). For comparison, known samples of the aluminosilicate ZSM-5 were used. Chemical analysis of the samples was done by atomic absorption spectroscopy. SEM analysis was conducted using a Cambridge Scanning Electron Microscope with Trace Northern X-ray detector.

Mossbauer spectra were measured using a conventional constant acceleration spectrometer, using a source of $^{57}$CoinRh. Spectra were recorded in 0 field at room temperature (RT) or liquid nitrogen temperature (LNT; 77° K.) and at 4.2° K. with either a low magnetic field (0.05 T) or a high field (8 T) applied parallel to the gamma ray direction. All isometer shifts are quoted relative to an absorber of metallic iron at room temperature. Fits at low field were performed using a standard lease square fitting routine. When fitting quadruple doublets, both peaks were constrained to have the same line with and intensity. Hyperfine split sextats were fit to 3 doublets and the hyperfine field estimated splitting of the outermost line. In all cases, it was found that the quadropole splitting (magnetic) was negative 0 mms/second. Average isomer shifts were calculated directly from the raw data by summation or from the fits. High field fits of paramagnetic spectra were obtained using a spin Hamiltonian simulation program.

Mossbauer spectral analysis disclose: the distribution between framework and non-framework iron, and the approximate particle size of the latter. Framework iron is in the form of tetrahedra, which in the Mossbauer spectra are indicated by a singlet or single peak (when absorption is measured against velocity in mm/sec) regardless of measurement temperature, with an average isomer shift (IS) no more than 0.3 mm/sec at room temperature. A doublet in the Mossbauer spectrum indicates a mixture of tetrahedral and octahedral iron, with the latter dispersed in a fine state of subdivision (no larger than 0.6 nanometers). A sexlet or six-line spectrum indicates the presence of large agglomerates (larger than 0.6 nanometers) of iron oxides. The Mossbauer spectrum indicates the presence of all iron present, regardless of its location.

Color of all samples was observed. All as synthesized samples were white, indicating that all or nearly all of the iron is in the framework at this stage. Thermally treated samples range from off-white to brown in color. Any discoloration indicates that at least part of the iron is present outside the framework as iron oxides. Color furnishes a qualitative indication as to the presence or absence of non-framework iron.

All thermally treated samples were base exchanged with the dilute potassium hydroxide to pH 8.0 in order to obtain base exchange capacity. Both the acidity and the base exchange capacity diminish as the amount of framework iron decreases. Therefore, observed base exchange capacity furnishes a confirmation of the amount of framework iron as determined by atomic absorption spectroscopy.

EXAMPLE 1

As-synthesized ferrisilicate molecular sieve. $SiO_2Fe_2O_3 = 98$ 100 g N-brand Silica (PQ Corp., Valley Forge, PA, $Na_2SiO_3.5H_2O$) in 100 g $H_2O$, is added to a solution containing 4.16 g $Fe(NO_3)_3.9H_2O$ dissolved in 50 g $H_2O$. The pH is adjusted to be strongly acidic with 7.5 g $H_2SO_4$ (96 percent). To the resulting pale lemon colored gel is added 12 g tetrapropylammonium bromide (Aldrich Chemical) in 50 g $H_2O$. After vigorous agitation the mixture is placed in a stainless steel autoclave, sealed and heated under its own pressure at 170° C. for 2 to 5 days, without stirring. The resulting white solid is filtered, washed with water and dried at 100° C. X-ray powder diffraction confirms the formation of the ZSM-5 structure. The material contains almost all of its iron in the framework of the molecular sieve, as shown by Mossbauer spectroscopy.

EXAMPLE 2

Thermally modified ferrisilicate molecular sieve, $SiO_2/Fe_2O_3 = 98$

The sample from Example 1 is heated in air at 110° C. for three hours. It is then carefully calcined in dry air in two stages. In the first stage it is heated in dry air at 300° C. for 2-3 hours followed by a second stage, where it is calcined in dry air at 600° C. for 18 hours. The sample obtained was then ammonium exchanged using excess 1M ammonium nitrate solution at 65° C. for two hours. The resulting solid sample is named as sample A for future reference herein. A portion of the sample A is heated at 110° C. for two hours. It is then heated in dry air at 300° C. for three hours and calcined in dry air at 600° C. for 18 hours. The sample is then potassium exchanged by titrating it with dilute KOH to a pH of 8.0. The sample is finally washed with water, filtered and air dried at 110° C. This material contains 71 percent of the iron in the framework of the molecular sieve. The remaining 29 percent of the iron is very finely dispersed throughout the molecular sieve, including the inside of the pores.

EXAMPLE 3

Hydrothermally modified ferrisilicate molecular sieve under mild conditions, $SiO_2/Fe_2O_3 = 98$ A portion of the sample A (of Example 2) is hydrothermally treated using steam at 650° C. for one hour. The sample is then potassium exchanged by titrating it with dilute KOH to a pH of 8.0. The resulting sample is washed with water, filtered and air dried at 110° C. This material contains 35 percent of the iron in the framework of the molecular sieve. The remaining 60 percent of the iron is outside the framework and is present inside and outside the pores of the molecular sieve.

EXAMPLE 4

Hydrothermally modified ferrisilicate molecular sieve under severe conditions. $SiO_2/Fe_2O_3 = 98$ A portion of the sample A (of Example 2) is hydrothermally treated using steam at 600° C. for 4 hours. The sample is then potassium exchanged by titrating it with dilute KOH to a pH of 8.0. The resulting sample is washed with water, filtered and air dried at 110° C. This material contains only 20 percent of the total iron in the framework of the molecular sieve. The remaining 80 percent of the iron is outside the framework and is present inside and outside the pores of the molecular sieves.

EXAMPLE 5

As synthesized molecular sieves; $SiO_2/Fe_2O_3$ ranging from 20 to 200 (General Procedure)

The iron containing reagent ($Fe(NO_3)_3$. $9H_2O$, or $FeCl_3.H_2O$) Fisher Reagent Grade) was dissolved in 100 g $H_2O$. The solution, was acidified with 16 g $H_2SO_4$ (96 percent) and 200 g N-brand silica (PQ Corp. $Na_2 SiO_3.5H_2O$) in 200 g $H_2O$ was added to this fresh solution. Immediate formation of a pale yellow gel was observed. To the gel was added 24 g tetrapropylammonium bromide (TPABr Aldrich Reagent Grade) in 40 g $H_2O$. The gel was heated in a stirred autoclave (Autoclave Engineers 1 $dm^3$ capacity) at 170° C. for 3 days under autogeneous pressure. The resulting white solid was filtered, washed and dried at 100° C. X-ray powder diffraction confirmed the presence of highly crystalline ferrisilicate with the zeolite ZSM-5 structure. Atomic absorption confirms $S1O_2/Fe_2O_3$ ratio.

FeZSM-5 (20): To 3.4 g, $FeCl_3.H_2O$ in 50 g $H_2O$ with 4.5 g $H_2SO_4$ is added 50 g N-brand silica in 50 g $H_2O$. to the resulting gel was added 6.3 g TPABr in 10 $H_2O$.

FeZSM-5 (50): To 15 g $Fe(NO_3)_3.9H_2O$ in 100 g $H_2O$ and 16 g $H_2SO_4$ was added 200 g N-brank silica in 200 g $H_2O$. After precipitates of the gel, 24 g TPABr in 40 g $H_2O$ was added.

FeZSM-5 (90): To 4.16 g $Fe (NO_3)_3.9H_2O$ dissolved in 50 g $H_2O$ and acidified with 7.5 g $H_2SO_4$ was added 100 g N-brank silicate in 100 g $H_2O$. After formation of the milky gel, 12 g TPABr in 25 g $H_2O$ was added.

FeZSM-5 (171): to 3.5 g $Fe(NO_3)_3.9H_2O$ dissolved in 100 g $H_2O$ and 16 g $H_2O_4$ was added 200 g N-brand silica in 200 g $H_2O$. After the white milly gel formed, 24 g TPABr in 50 g $H_2O$ was added.

Silicalite: To a 15 g $H_2SO_4$ in 75 g $H_2O$ solution was added 150 g N-brank silicate in 150 g $H_2O$ to this was added 18 g TPA Br in 100 g $H_2O$. (This is included for comparison).

EXAMPLE 6

Thermally modified ferrisilicate molecular sieve; $SiO_2/Fe_2O_3=20$

The as-synthesized sample of ferrisilicate molecular sieve with $SiO_2/Fe_2O_3$ of 20 is dried in air at 110° C. for three hours. It is then heated in dry nitrogen for two hours at 145° C., followed by heating at 500° C. for 8-10 hours. It is cooled to 145° C. in dry nitrogen and then switched to dry air at 145° C. for 2 hours. Finally, the sample is calcined in dry air at 500° C. for 4 to 5 hours.

An ammonium exchanged form of the sample was obtained by ammonium exchange using excess 1M ammonium nitrate solution at 65° C. for two hours.

A portion of this sample is heated at 110° C. for two hours, then heated in dry air at 145° C. for two hours and finally calcined in dry air at 500° C. for 5 hours. The sample is then potassium exchanged by titrating it with dilute KOH to a pH of 8.0.

EXAMPLE 7

Hydrothermally modified ferrisilicate molecular sieve under very mold conditions $SiO_2/Fe_2O_3=20$ A portion of the ammonium exchanged sample (of Example 6) is hydrothermally treated using steam at 300° C. for one to four hours. The sample is then potassium exchanged by titrating it with dilute KOH to a pH of 8.0. The resulting sample is washed with water, filtered and air dried at 110° C.

EXAMPLE 8

Hydrothermally modified ferrisilicate molecular sieve under mild conditions. $SiO_2/Fe_2O_3=20$ A portion of the ammonium exchanged sample (of Example 6) is hydrothermally treated using steam at 550° C. for one hour. The sample is then potassium exchanged by titrating it with dilute KOH to a pH of 8.0. The resulting sample is washed with water, filtered and air dried at 110° C.

EXAMPLE 9

Hydrothermally modified ferrisilicate molecular sieve under moderate conditions; $SiO_2/F_2O_3=20$ Two portions of the ammonium exchanged samples (of Example 6) hydrothermally treated using steam at 550° C. for two and four hours respectively. The two portions are then potassium exchanged separately by titrating them with dilute KOH to a pH of 8.0. The resulting samples are washed with water, filtered and air dried at 110° C.

EXAMPLE 10

Hydrothermally modified ferrisilicate molecular sieves under moderate conditions for long periods of time; $SiO_2/Fe_2O_3=20$ Portions of the ammonium exchanged samples of Example 6 are hydrothermally treated using steam at 550° C. for 8 to 72 hours. The samples are then potassium exchanged by titrating them separately with dilute KOH to a pH of 8.0. The resulting samples are washed with water, filtered and air dried at 110° C.

EXAMPLE 11

Hydrothermally modified ferrisilicate molecular sieves under severe conditions; $SiO_2/Fe_2O_3=20$ Portions of the ammonium exchanged samples of Example 6 are hydrothermally treated using steam at 600° to 700° C. for one to 8 hours. The samples are then potassium exchanged by titrating them separately with dilute KOH to a pH of 8.0. The resulting samples are washed with water, filtered and air dried at 110° C.

EXAMPLE 12

Thermally modified ferrisilicate molecular sieve; $SiO_2/Fe_2O_3=50$

The as synthesized sample of ferrisilicate molecular sieve with $SiO_2/Fe_2O_3$ of 50 is heated in air at 110° C. for three hours. It is then heated in dry nitrogen for two hours at 145° C. followed by heating at 500° C. in dry nitrogen for 8-10 hours. It is cooled to 145° C. in dry nitrogen and then switched to dry air at 145° C. for 2 hours. Finally, the sample is calcined in dry air at 500° C. for 4 to 5 hours.

An ammonium exchanged form of the sample was obtained by ammonium exchange using excess 1M ammonium nitrate solution at 65° C. for two hours.

For hydrothermal modification of the material, an ammonium exchanged form of the sample is obtained by ammonium exchanged using excess 1M ammonium nitrate solution at 65° C. for two hours.

A portion of this sample is heated at 110° C. for two hours, then heated in dry air at 145° C. for two hours and finally calcined in dry air at 500° C. for 5 hours. The sample is then potassium exchanged by titrating it with dilute KOH to a pH of 8.0.

EXAMPLE 13

Hydrothermally modified ferrisilicate molecular sieve under very mild conditions; $SiO_2/Fe_2O_3=50$ A portion of the ammonium exchanged sample of Example 12 is hydrothermally treated using steam at 300° C. for one to four hours. The sample is then potassium exchanged by titrating it with dilute KOH to a pH of 8.0. The resulting sample is washed with water, filtered and air dried at 110° C.

EXAMPLE 14

Hydrothermally modified ferrisilicate molecular sieve under mild conditions; $SiO_2/Fe_2O_3=50$ A portion of the ammonium exchanged sample of Example 12 is hydrothermally treated using steam at 550° C. for one hour. The sample is then potassium exchanged by titrating it with dilute KOH to a pH of 8.0. The resulting sample is washed with water, filtered and air dried at 110° C.

EXAMPLE 15

Hydrothermally modified ferrisilicate molecular sieve under moderate conditions; $SiO_2/Fe_2O_3=50$ Two portions of the ammonium exchanged sample of Example 12 is hydrothermally treated using steam at 550° C. for two and four hours respectively. The two portions are potassium exchanged separately by titrating them with dilute KOH to a pH of 8.0. The resulting samples are washed with water, filtered and air dried at 110° C.

EXAMPLE 16

Hydrothermally modified ferrisilicate molecular sieves under moderate conditions for long periods of time; $SiO_2/Fe_2O_3=50$ Portions of the ammonium exchanged samples of Example 12 are hydrothermally treated using steam at 550° C. for 8 to 72 hours. The samples are then potassium exchanged by titrating them separately with dilute KOH to a pH of 8.0. The resulting samples are washed with water, filtered and air dried at 110° C.

EXAMPLE 17

Hydrothermally modified ferrisilicate molecular sieves under severe conditions; $SiO_2/Fe_2O_3=50$ Portions of the ammonium exchanged samples of Example 12 are hydrothermally treated using steam at 600° to 700° C. for one to 8 hours. The samples are then potassium exchanged by titrating them separately with dilute KOH to a pH of 8.0. The resulting samples are washed with water, filtered and air dried at 110° C.

EXAMPLE 18

Thermally modified ferrisilicate molecular sieve; $SiO_2/Fe_2O_3=90$

The as-synthesized sample of ferrisilicate molecular sieve with $SiO_2/Fe_2O_3$ of 90 is heated in air at 110° C. for three hours. It is then heated in dry nitrogen for two hours at 145° C. followed by heating it at 500° C. in dry nitrogen for 8–10 hours. It is cooled to 145° C. in dry nitrogen and then switched to dry air at 145° C. for 2 hours. Finally, the sample is calcined in dry air at 500° C. for 4 to 5 hours.

For hydrothermal modification of the material, an ammonium exchanged form of the sample is obtained by ammonium exchange using excess 1M ammonium nitrate solution at 65° C. for two hours.

A portion of this sample is heated at 110° C. for two hours, then heated in dry air at 145° C. for two hours and finally calcined in dry air at 500° C. for 5 hours. The sample is then potassium exchanged by titrating it with dilute KOH to a pH of 8.0.

EXAMPLE 19

Hydrothermally modified ferrisilicate molecular sieve under very mild conditions; $SiO_2/Fe_2O_3=90$ A portion of the ammonium exchanged sample of Example 18 is hydrothermally treated using steam at 300° C. for one to four hours. The sample is then potassium exchanged by titrating it with dilute KOH to a pH of 8.0. The resulting sample is washed with water, filtered and air dried at 110° C.

EXAMPLE 20

Hydrothermally modified ferrisilicate molecular sieve under mild conditions. $SiO_2/Fe_2O_3$ A portion of the ammonium exchanged sample of Example 18 is hydrothermally treated using steam at 550° C. for one hour. The sample is then potassium exchanged by titrating it with dilute KOH to a pH of 8.0. The resulting sample is washed with water, filtered and air dried at 110° C.

EXAMPLE 21

Hydrothermally modified ferrisilicate molecular sieve under moderate conditions; $SiO_2/Fe_2O_3=90$ Two portions of the ammonium exchanged sample of Example 18 are hydrothermally treated using steam at 550° C. for two and four respectively. The two portions are potassium exchanged separately by titrating them with dilute KOH to a pH of 8.0. The resulting samples are washed with water, filtered and air dried at 110° C.

EXAMPLE 22

Hydrothermally modified ferrisilicate molecular sieves under moderate conditions for long periods of time; $SiO_2/Fe_2O_3=90$ Portions of the ammonium exchanges samples of Example 18 are hydrothermally treated using steam at 550° C. for 8 to 72 hours. The samples are then potassium exchanged by titrating them separately with dilute KOH to a pH of 8.0. The resulting samples are washed with water, filtered and air dried at 110° C.

EXAMPLE 23

Hydrothermally modified ferrisilicate molecular sieves under severe conditions $SiO_2/Fe_2O_3=90$ Portions of the ammonium exchanged samples of Example 18 are hydrothermally treated using steam at 600° to 700° C. of done to 8 hours. The samples are then potassium exchanged by titrating them sieve dilute KOH to a pH of 8.0. The resulting samples are washed with water, filtered and air dried at 110° C.

EXAMPLE 24

Thermally modified ferrisilicate molecular sieve; $SiO_2/Fe_2O_3=200$

The as-synthesized sample of ferrisilicate molecular sieve with $SiO_2/Fe_2O_3$ of 200 is heated in air at 110° C. for three hours. It is then heated in dry nitrogen for two hours at 145° C. followed by heating it at 500° C. in dry nitrogen for 8 to 10 hours. It is cooled to 145° C. in dry nitrogen and then switched to dry air at 145° C. for 2 hours. Finally, the sample is calcined in dry air at 500° C. for 4 to 5 hours.

For hydrothermal modification of the material, an ammonium exchanged form of the sample was obtained by ammonium exchange using excess 1M ammonium nitrate solution at 65° C. for two hours.

A portion of this sample is heated at 110° C. for two hours, then heated in dry air at 145° C. for two hours and finally calcined in dry air at 500° C for 5 hours. The sample is then potassium exchanged by titrating it with dilute KOH to a pH of 8.0.

EXAMPLE 25

Hydrothermally modified ferrisilicate molecular sieve under very mild conditions; $SiO/Fe_2O_3=200$ A portion of the ammonium exchanged sample of Example 24 is hydrothermally treated using steam at 300° C. for one to four hours. The sample is then potassium exchanged by titrating it with dilute KOH to a pH of 8.0. The resulting sample is washed with water, filtered and air dried at 110° C.

EXAMPLE 26

Hydrothermally modified ferrisilicate molecular sieve under mild conditions; $SiO_2/Fe_2O_3=200$ A portion of the ammonium exchanged sample of Example 24 is hydrothermally treated using steam at 550° C. for one hour. The sample is then potassium exchanged by titrating it with dilute KOH to a pH of 8.0. The resulting sample is washed with water, filtered and air dried at 110° C.

EXAMPLE 27

Hydrothermally modified ferrisilicate molecular sieve under moderate conditions $SiO_2/Fe_2O_3=200$ Two portions of the ammonium exchanged sample of Example 24 are hydrothermally treated using steam at 550° C. for two and four hours respectively. The two portions are then potassium exchanged, separately by titrating them with dilute KOH to a pH of 8.0. The resulting samples are washed with water, filtered and air dried at 110° C.

EXAMPLE 28

Hydrothermally modified ferrisilicate molecular sieves under moderate conditions for long periods of time; $SiO_2/Fe_2O_3=200$ Portions of the ammonium exchanged samples of Example 24 are hydrothermally treated using steam at 550° C. for 8 to 72 hours. The samples are then potassium exchanged by titrating them separately with dilute KOH to a pH of 8.0. The resulting samples are washed with water, filtered and air dried at 110° C.

EXAMPLE 29

Hydrothermally modified ferrisilicate molecular sieves under severe conditions; $SiO_2/Fe_2O_3=200$ Portions of the ammonium exchanged samples of Example 24 are hydrothermally treated using steam at 600° to 700° C. for one to 8 hours. The samples are then potassium exchanged by titrating them separately with dilute KOH to a pH of 8.0. The resulting samples are washed with water, filtered and air dried at 110° C.

EXAMPLE 30

Preparation of gasoline range hydrocarbons from synthesis gas

Mixture of carbon monoxide and hydrogen (synthesis gas) are passed over the thermally treated ferrisilicate molecular sieve of Example 12 under the following process conditions: $H_2/CO$ ratio of 1.0 to 3.0, pressure of 15 to 30 atmospheres, temperature of 300° C. to 400°, flow rates of 8 to 60 cc/min. The weight of catalyst is approximately 0.4 grams. The products include gasoline range hydrocarbons.

EXAMPLE 31

Preparation of light hydrocarbons from synthesis gas

A series of experiments was conducted in a plug-flow micro-reactor system using a hydrothermally treated (for 2 hours at 500° C.) molecular sieve having a $SiO_2/Fe_2O_3$ ratio of 50, prepared according to Example 15. The $H_2/CO$ ratio in these experiments is set at 3. Approximately 0.4 gram of catalyst is used in each run. Two series of experiments, one at one atmosphere, the other at 12 atmospheres, are carried out. Flow rates and other process conditions are varied as shown in Table II below. Also shown in Table II are the product distributions attained in each run.

TABLE II

| Run | 1 | 2 | 3 | 4 | 5 | 6 |
|---|---|---|---|---|---|---|
| Pressure, atm | 1.0 | 1.0 | 1.0 | 12 | 12 | 12 |
| Reactor temp. °C. | 250 | 300 | 350 | 250 | 300 | 350 |
| Feed gas flow rate, cc/.min | 60.0 | 60.0 | 60.0 | 25 | 8 | 6 |
| Product distribution, mole % | | | | | | |
| Methane | 52 | 45 | 45 | 50 | 45 | 47 |
| Ethane | — | 8 | 8 | 2 | 22 | 20 |
| Ethylene | 25 | 24 | 24 | 12 | 1 | 1 |
| Propane | — | — | 2 | 6 | 12 | 14 |
| Propylene | 23 | 21 | 19 | 9 | 2 | 1 |
| $C_4$ | — | — | — | — | 7 | 8 |
| $C_5$ | — | — | — | — | 4 | 4 |
| $C_6$ | — | — | — | — | 3 | 2 |
| $C_7$ | — | — | — | — | 1 | 1 |
| $C_8$ | — | — | — | — | 1 | trace |

All percentages of hydrocarbon products in the above Table II are based on the amount of CO converted.

While in accordance with patent statutes, a preferred embodiment and best mode has been presented, the scope of the invention is not limited thereto, but rather is measured by the scope of the attached claims.

What is claimed is:

1. A process for preparing a ferrisilicate molecular sieve which comprises:
   (a) adding a silica source and one or more compounds selected from the group consisting of primary, secondary and tertiary amines, and quaternary ammonium compounds to an acidic aqueous solution of an iron (III) compound, and maintaining said solution in the acidic state until the addition of said silica source is complete;
   (b) heating the mixture obtained in step (a) at a temperature of about 100° to about 250° C. until molecular sieve crystals are formed; and
   (c) thermally treating the molecular sieve crystals formed in step (b) at a temperature from about 250° C. to about 1000° C. in an inert atmosphere at about 450° to about 800° C. for about 6 to about 16 hours, then in air at about 400° to about 1000° C. for about 3 to about 8 hours, and then with steam at a temperature from about 300° to about 700° C. for about 1 to about 4 hours.

2. A process according to claim 1 in which said silica source is added first and said amine or quaternary ammonium compound is added after the addition of said silica source is complete.

3. A process according to claim 1, in which said silica source is an aqueous solution of sodium silicate.

4. A process according to claim 1 to which said one or more compounds added in step (a) are one or more quaternary ammonium compounds.

5. A process according to claim 1 in which said inert atmosphere is a nitrogen atmosphere.

6. A process according to claim 1 in which iron in the as synthesized molecular sieve is predominantly in the crystal framework and in the thermally treated molecular sieve is about 15 to about 40 percent in the framework and about 60 to about 85 percent outside the framework.

* * * * *